July 27, 1965 C. W. UNGER 3,197,043
BALE BUNCHER ATTACHMENT FOR HAY BALERS
Filed March 15, 1962 6 Sheets-Sheet 1

INVENTOR.
Clayton W. Unger
BY
ATTYS.

July 27, 1965 C. W. UNGER 3,197,043
BALE BUNCHER ATTACHMENT FOR HAY BALERS
Filed March 15, 1962 6 Sheets-Sheet 2

INVENTOR.
Clayton W. Unger
BY Wells & St John
ATTYS.

INVENTOR.
Clayton W. Unger
BY
ATTYS.

July 27, 1965
C. W. UNGER
3,197,043
BALE BUNCHER ATTACHMENT FOR HAY BALERS
Filed March 15, 1962
6 Sheets-Sheet 4
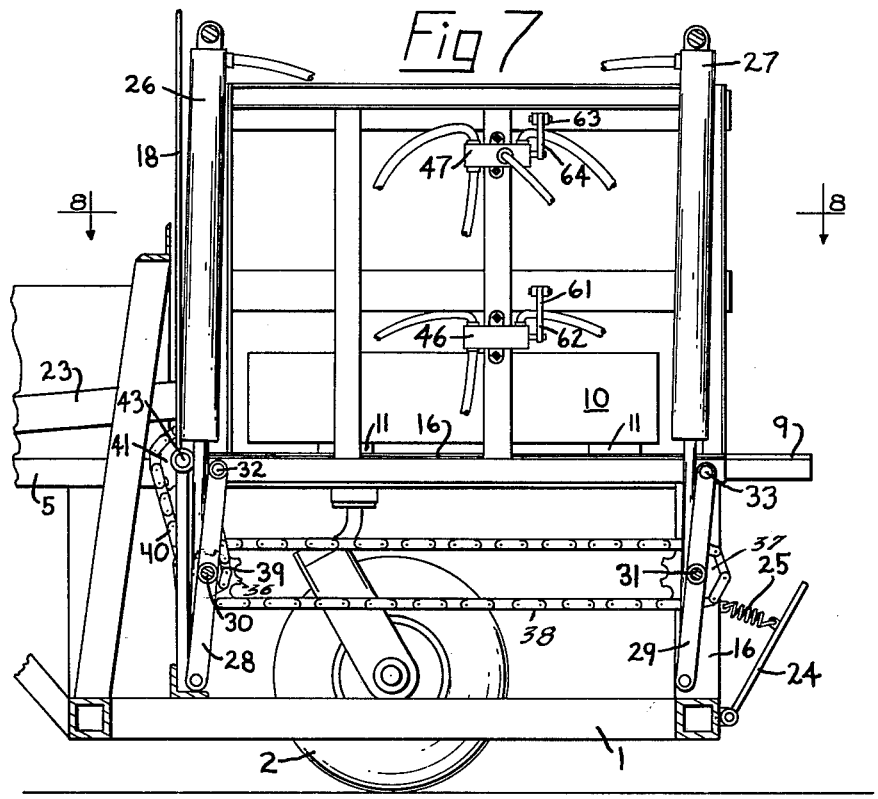
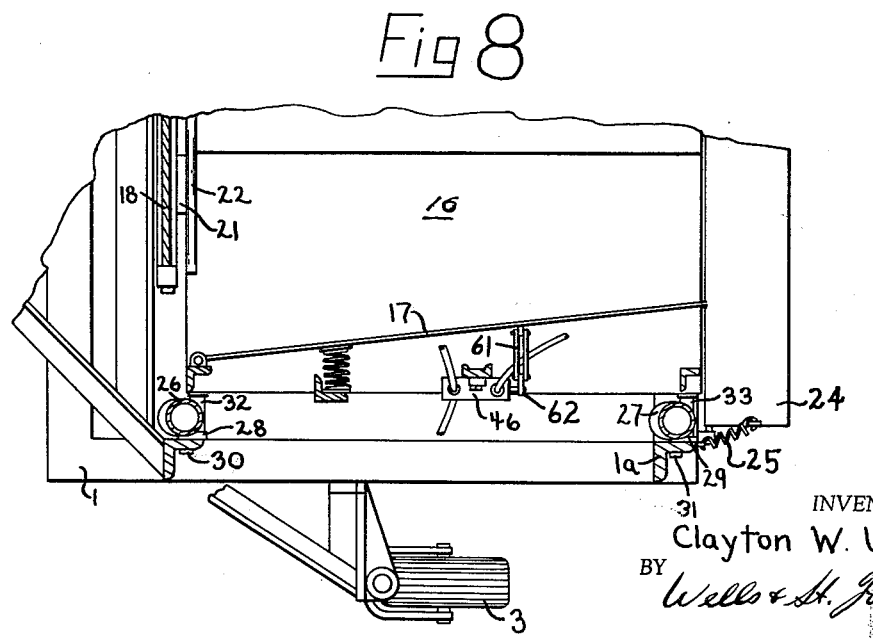
INVENTOR.
Clayton W. Unger
BY Wells & St. John
ATTYS.

July 27, 1965 C. W. UNGER 3,197,043
BALE BUNCHER ATTACHMENT FOR HAY BALERS
Filed March 15, 1962 6 Sheets-Sheet 5
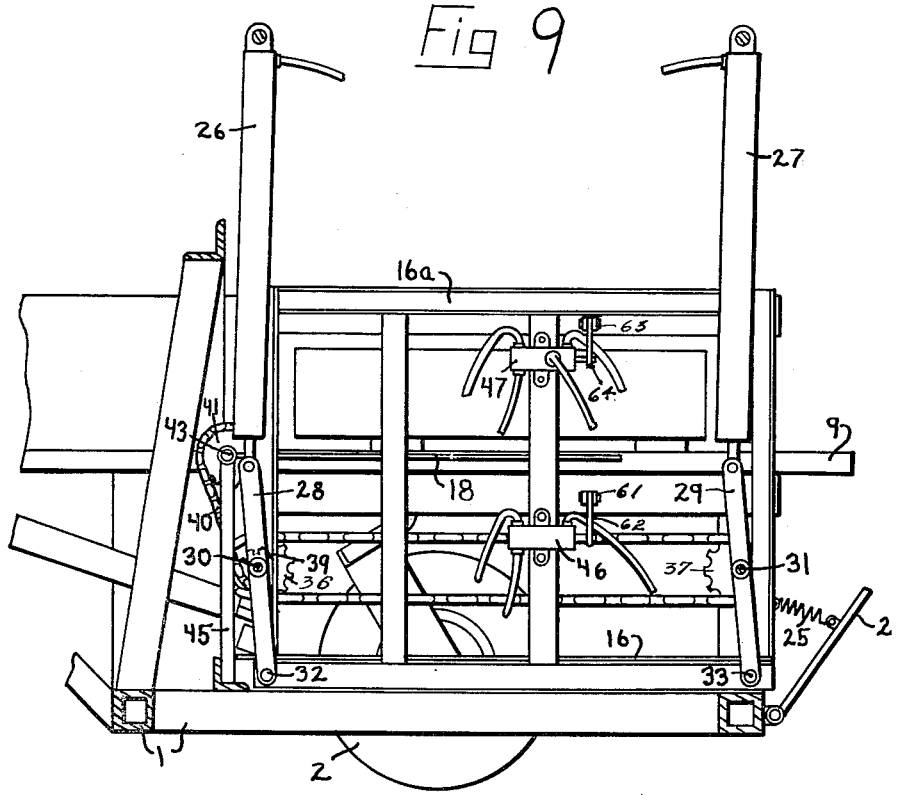
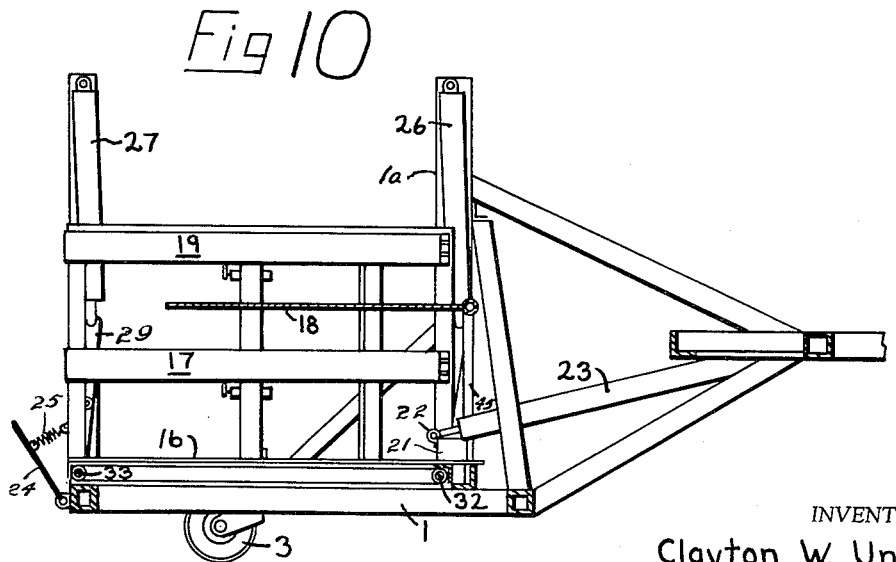
INVENTOR.
Clayton W. Unger
BY Wells & St. John
ATTYS.

July 27, 1965  C. W. UNGER  3,197,043
BALE BUNCHER ATTACHMENT FOR HAY BALERS
Filed March 15, 1962  6 Sheets-Sheet 6
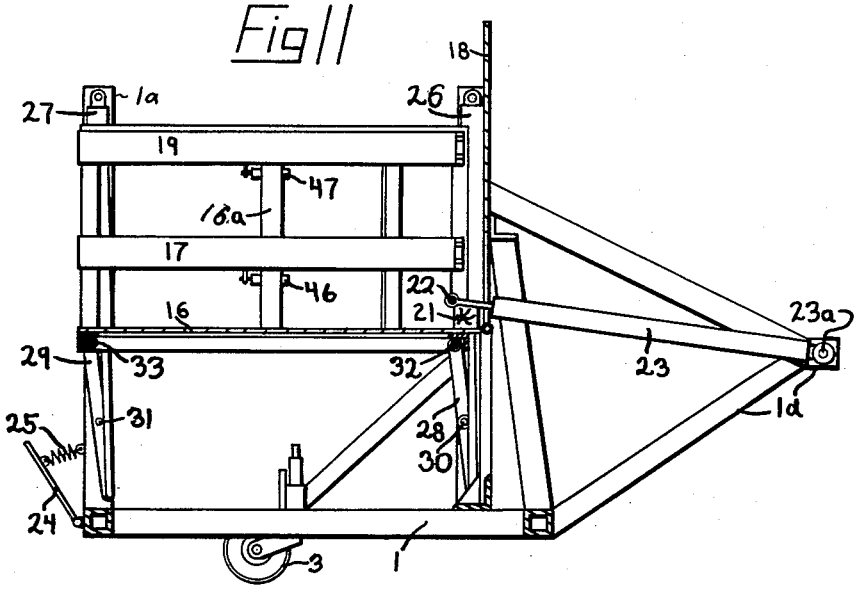
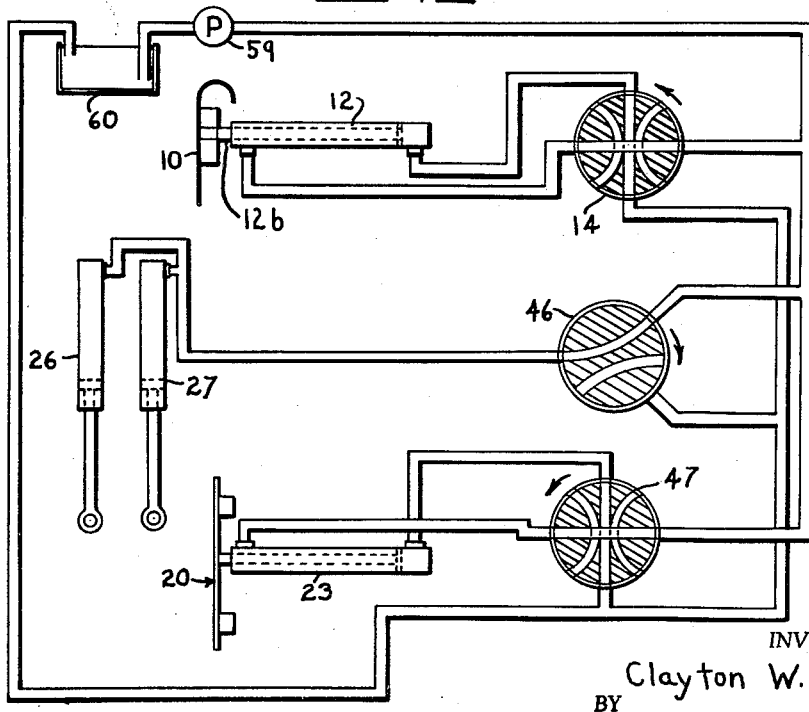
INVENTOR.
Clayton W. Unger
BY
Wells & St John
ATTYS.

United States Patent Office 3,197,043
Patented July 27, 1965

3,197,043
BALE BUNCHER ATTACHMENT FOR HAY BALERS
Clayton W. Unger, % Brewster Machine Co., Box 215, Brewster, Wash.
Filed Mar. 15, 1962, Ser. No. 179,974
2 Claims. (Cl. 214—6)

My invention relates to a bale buncher attachment for hay balers. It is embodied in a wheel supported vehicle that is adapted to be attached to the delivery chute of a hay baler so that it will always remain in line with the delivery chute and receive the hay bales from it.

The principal purpose of my invention is to provide a bale buncher that receives bales coming one at a time from the baler delivery chute upon a platform having a pusher to push the bales, as received, from this platform to a second vertically shiftable platform having room to receive a plurality of bales side by side. This vertically movable platform has associated therewith a lowering mechanism adapted to lower the platform a bale height when it is full, through actuation of a control means by the advance of bales across the platform. The lowering of the platform acts to lay a plate over the bales on the platform in position to receive a second layer of bales over the first layer. The buncher embodies means, automatically operable when the second layer of bales have been pushed into place, to push the stack of bales thus formed from the buncher.

It is also a purpose of my invention to provide a bale buncher of the character described with means operable by misalignment of a bale coming from the baler to deflect the bale pusher that transfers the bale to the vertically movable platform, out of the way of the misaligned bale and then return the pusher to operative position upon alignment or removal of the misaligned bale.

It is also a purpose of the invention to provide in a bale buncher of the character described a releasable stop mechanism for the bales coming from the baler which stop mechanism is operatively connected to the transfer pusher to actuate it when a bale is properly positioned on the bale receiving platform.

Other objects and advantages of the invention will appear more fully from the following detailed description and the accompanying drawings wherein a preferred form of my invention is shown. It should be understood, however, that the drawings and description are illustrative only and are not intended to limit the invention defined in the claims.

In the drawings:

FIGURE 7 is an enlarged sectional view taken on the line 7—7 of FIGURE 4;

FIGURE 8 is a fragmentary sectional view taken on the line 8—8 of FIGURE 7;

FIGURE 9 is a sectional view like FIGURE 7 but showing the vertically movable platform in lowered position;

FIGURE 10 is a sectional view taken on the line 10—10 of FIGURE 4 showing the vertically movable platform in lowered position;

FIGURE 11 is a sectional view taken on the line 11—11 of FIGURE 4 showing the vertically movable platform in raised position; and FIGURE 12 is a diagrammatic view showing the components and connections for the hydraulic system that operates the several moving parts of the buncher.

Figure 1:
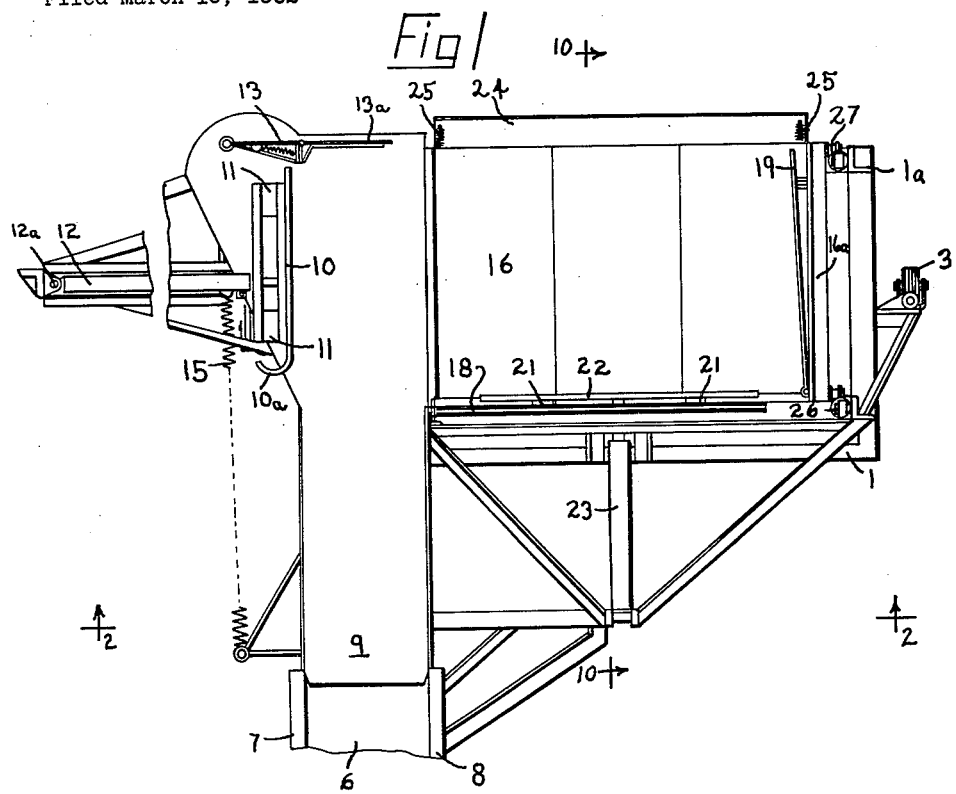
FIGURE 1 is a plan view of a bale buncher constructed according to my invention.
Figure 2:
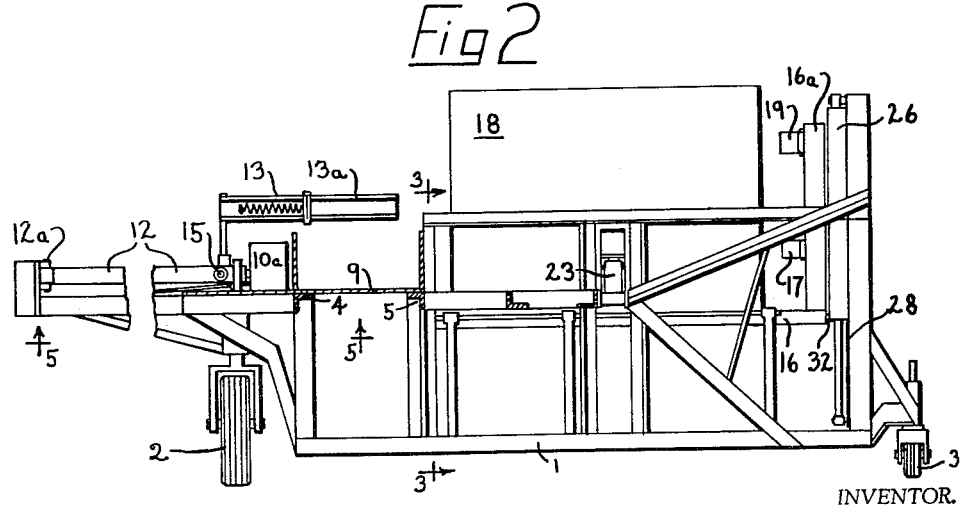
FIGURE 2 is a sectional view taken on the line 2—2 of FIGURE 1.
Figure 3:
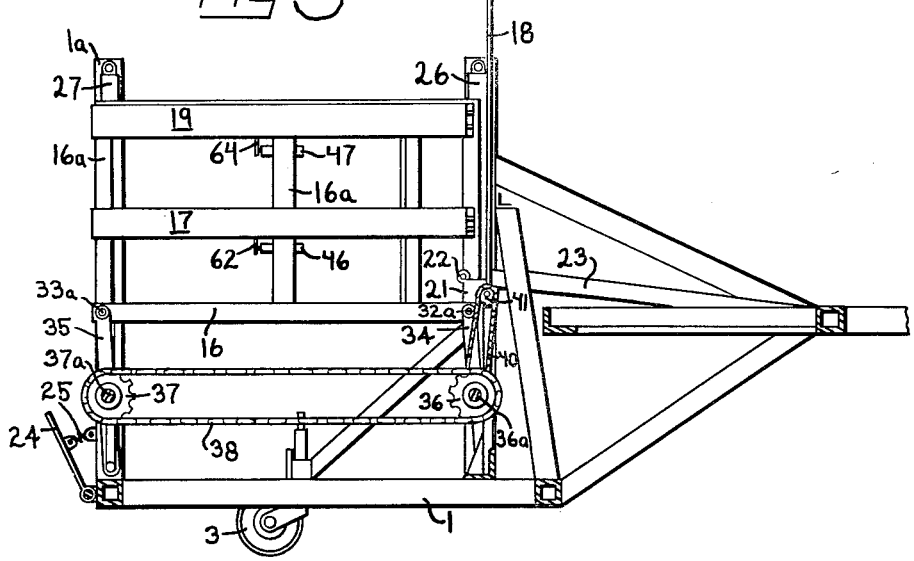
FIGURE 3 is a sectional view taken on the line 3—3 of FIGURE 2.
Figure 4:
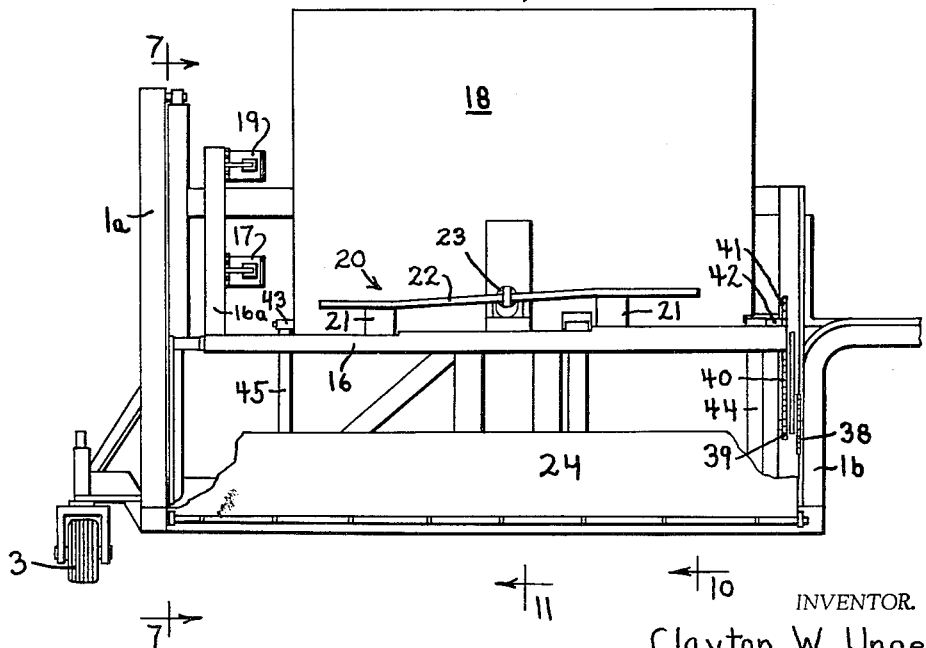
FIGURE 4 is an enlarged fragmentary rear end view of the bale buncher showing the vertically movable platform in raised position certain of the details of the control mechanism being left off for the sake of clearness.

The machine embodies a main framework 1 that is mounted on two caster wheels 2 and 3 and there are two forwardly extending connecting frame members 4 and 5 that pivotally attach to the hay baler frame at transversely spaced points so as to align the bale buncher with the hay baler, but to allow it to pivot up and down to accommodate uneven ground. From the hay baler there is a platform 6 extending rearwardly that has two side plates 7 and 8 to keep the bales aligned as they are pushed back from the baler. Rearwardly of this platform 6 there is a second platform 9 that carries a mechanism for moving a bale transversely when it gets back near the rear end of the second platform 9. The mechanism by which the bale is moved transversely comprises a pusher bar 10 which is mounted on two wooden blocks 11 that slide on the second platform 9. This pusher bar 10 is moved transversely by a hydraulic jack 12 that is controlled for movement forward by a swinging arm 13 mounted toward the rear of the platform and behind the pusher 10. This swinging arm 13 has its tip portion 13a, that is engaged by the bale, hinged to the main arm so that, if a bale is not removed by the pusher 10, the tip portion can bend back and let a bale continue on and be dumped on the ground. The control arm operates a valve opening mechanism to open a valve 14 to supply hydraulic fluid to the back end of the pusher cylinder. The pusher itself has a rounded front end 10a that can be engaged by the bale if for any reason the pusher is not retracted. After the pusher is engaged it can move rearwardly on the platform because the pusher 10 and its cylinder 12 are pivoted at 12a to swing rearwardly. A long coil spring 15 is attached to the pusher to return it to normal operating position.

Alongside the pusher platform there is a second platform 16 on the main frame of the buncher and this second platform is adapted to be raised and lowered between an upper position where it receives a first set of bales until it gets 3 bales thereon and a lower position where three more bales are placed on the first bales. In the drawings this platform is shown as having steps in it to help the bales as they move horizontally across it. These steps are not necessary. When the platform 16 is in its raised position and three bales are moved across it the first bale on the platform 16 eventually reaches a swinging arm 17 on the platform 16 and moves the arm 17, thus actuating a control valve 46 that operates the platform lowering mechanism. This arm 17 is spring pressed out so that it will return to platform raising position as soon as the bales are moved away from it.

In front of the platform 16 there is a pivoted plate 18 big enough to support the bales and this plate is connected to the platform raising and lowering mechanism so that when the platform 16 is raised to its upper position the plate 18 is swung up to an upright position and when the platform 16 is lowered to its lower position the plate 18 is swung down over the bales to rest on them so that another row of bales can be pushed across over the plate 18 by the pusher 10. The platform 16 has a second or upper swinging arm 19 thereon which is engaged by the upper layer of bales that are slid across on the plate. This second arm 19 is spring pressed outward against the bales and it operates a valve 47 that controls a mechanism for causing a pusher 20 that is mounted on the frame of the machine in front of the platform 16 to push the bales rearwardly by pushing on the lower layer of bales. Note that the plate 18 does not extend rearwardly the full fore and aft width of the platform 16 so that part of each bale rides on the lower row of bales as the bales are pushed across on top of the plate 18. This enables the pusher 20 to engage the lower layer of bales and in pushing them to cause the lower bales to drag the upper layer of bales off of the plate 18.

The pusher 20 assembly comprises a pair of blocks 21 that ride on the platform 16 and a cross bar 22 connecting them, this cross bar being connected to the piston of a cylinder 23 which is supplied with hydraulic fluid when the upper arm 19 of the platform 16 is pushed back by a bale.

The framework has a rear gate 24 that is normally raised by springs 25 to act as a rear stop for the bales and this gate 24 is pushed down by the pusher 20 that moves the bales rearwardly, pushing the bales hard enough against it to overcome the spring force that keeps the rear gate raised.

The operating mechanism that raises and lowers the platform 16 comprises a pair of jacks 26 and 27 suspended on the main frame 1 at the opposite end thereof from the pusher 10. These jacks extend up and down between the upstanding end 16a of the platform 16 and the upstanding end portion 1a of the main frame 1. The spring pressed arms 17 and 19 are mounted on the end 16a of the platform 16. Valves 46 and 47 of the hydraulic system are also mounted on this end 16a.

The hydraulic jack 26 has its piston pivoted to one end of a lever 28 that is pivoted by a stub shaft 30 to the end portion 1a of the main frame 1. The other jack 27 has its piston pivoted to one end of a lever 29 that is pivoted by a stub shaft 31 to the end portion 1a of the main frame 1. The other ends of the levers 28 and 29 are fixed to shafts 32 and 33 which are rotatably mounted to the underside of the platform 16. They extend full length of the platform 16 and beyond the platform 16. The projecting ends 32a and 33a of the shafts 32 and 33 have lever arms 34 and 35 affixed thereto and extending down to the hubs of two sprocket wheels 36 and 37 that are fixed on stub shafts 36a and 37a that are rotatably mounted on the main frame portion 1b next to the platform 9. This construction enables the jacks 26 and 27 to move the levers 28 and 29 and the platform 16 between the raised platform position shown in FIGURE 7 and the lowered platform position shown in FIGURE 9. The shafts 32 and 33 turn as the platform 16 is thus lowered and the lever arms 34 and 35 fixed to these shafts turn the sprocket wheels 36 and 37 as the platform is lowered.

The sprocket wheels 36 and 37 being connected by a sprocket chain 38 must turn together as the platform 16 is lowered and raised. The shaft 36a also carries a smaller sprocket wheel 39 which is connected by a chain 40 to a larger sprocket wheel 41 that is fixed on a shaft 42 which is mounted on the plate 18. The other end of the plate 18 has a shaft 43 thereon which is rotatably supported by a post 45 carried by the frame 1. A post 44 supports the shaft 42.

The ratio of the sprocket wheel 41 to the smaller sprocket wheel 39 is such that the approximate 170 degree turning of the sprocket wheels 36 and 39 by the jack 26, the lever 28, the shaft 32 and the lever arm 34 will turn the plate 18 from upright position to horizontal position as the platform 16 is lowered to its lowermost position and will turn the plate 18 back to upright position as the platform 16 is returned to its uppermost position.

The cylinder 23 that actuates the pusher 20 is pivoted at 23a (see FIGURE 11) to a forwardly extending portion 1d of the main frame 1. This is necessary in order that the blocks 21, which rest on the platform 16, can move up and down with the platform 16.

Figure 5:
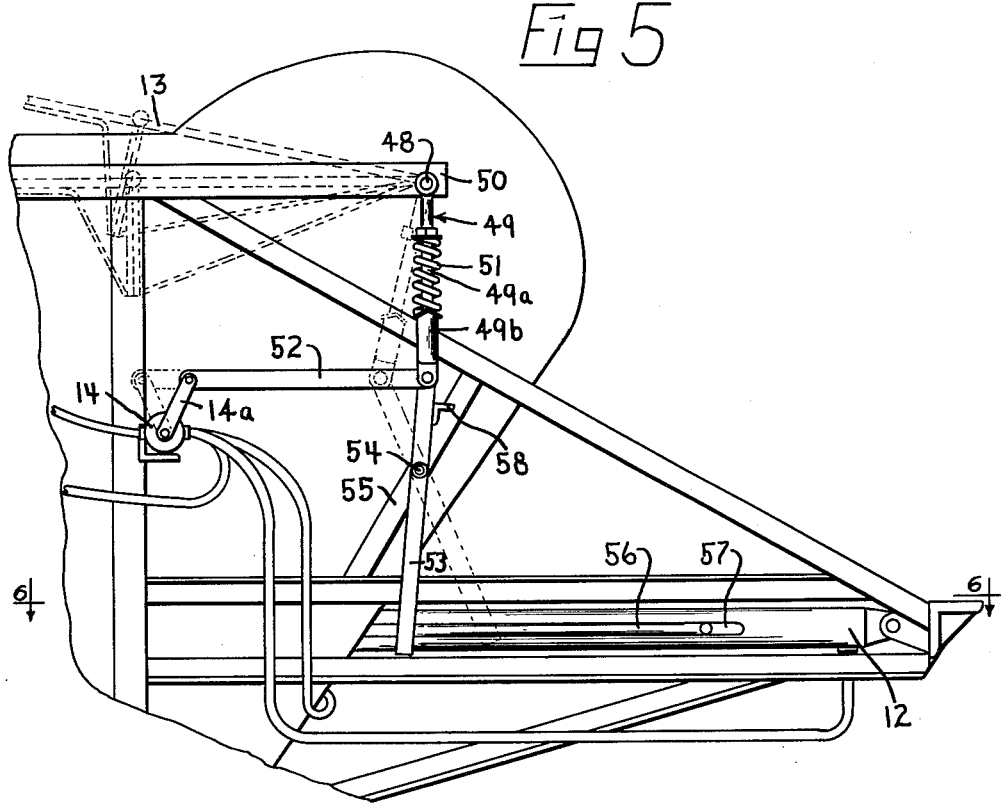
FIGURE 5 is an enlarged fragmentary bottom plan view looking up at FIGURE 2 from the line 5—5.
Figure 6:
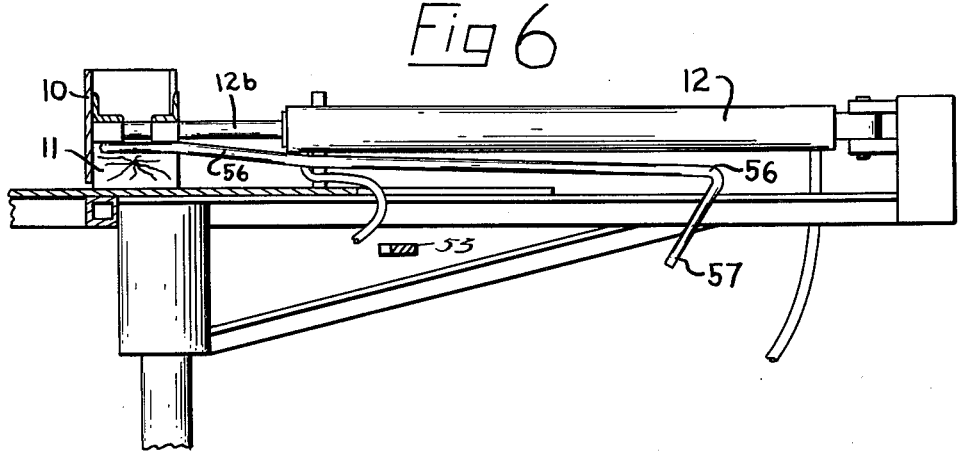
FIGURE 6 is a sectional view taken on the line 6—6 of FIGURE 5.

The specific valve opening mechanism by which the pusher bar 10 is operated is shown best in FIGURES 5 and 6. The arm 13 is connected rigidly by a pin 48 to a toggle arm 49. The pin 48 is pivotally supported by a cross bar 50 which is part of the support for platform 9 and goes through the platform 9 and the cross bar 50. The toggle arm 49 is an extensible arm having a reduced portion 49a slidable in a tubular portion 49b with a spring 51 around the reduced portion tending to extend the length of the arm 49. The portion 49b has a link 52 and a lever 53 pivoted to its free end. The link 52 connects to the operating lever 14a of the valve 14. The lever 53 is pivoted at 54 to a brace member 55 beneath the platform 9 and extends beyond this pivot point beneath the jack cylinder 12. The piston rod 12b of the jack 12 carries a trip rod 56 that has its free end 57 turned down to hook behind the lever 53. A stop 58 limits the angular movement of the lever 53 in one direction.

The operation of the mechanism just described is as follows. The normal position of the parts is shown in full lines in FIGURE 5. The valve 14 in this position supplies fluid to the cylinder of the jack 12 to hold the piston rod 12b and the pusher 10 in the position shown in FIGURE 6. The swinging arm 13 extends straight across the platform 9. The toggle action of the arm 49 holds the lever 53 past center against the stop 58. Now when a bale moves the arm 13 clockwise as seen in FIGURE 5 this swings the toggle arm 49 to the dotted position and reverses the valve 14 to push the piston rod 12a and the pusher 10 out and move the bale off the platform 9 transversely of the machine and on to the platform 16 or the plate 18. As the piston approaches the end of its stroke the end 57 of the trip rod 56 engages the free end of the lever 53 and moves it over far enough to re-set the toggle arm 49 in its original position. This also reverses the valve 14 and restores the swinging arm 13 to its original position ready to be actuated by the next bale.

The hydraulic fluid diagram in FIGURE 12 shows the operating valves and cylinders with a pump 59 and a reservoir 60 for the hydraulic fluid. The operation of the buncher by these controls is accomplished as follows: When a bale encounters the swinging arm 13 the valve 14 is turned in the direction of the arrow shown in FIGURE 12. This reverses the fluid connections to the cylinder 12 to force the pusher 10 across the platform 9 to the platform 16 which at this time is in raised position. The jacks 26 and 27 as shown in FIGURE 12 are under pressure from the pump 59 through the valve 46 so they hold the platform 16 in raised position.

The valve 14 is reversed when the piston rod 12b has travelled far enough out to cause the hook 57 to engage the lever 53 and return it to the full line position shown in FIGURE 5. This directs fluid into the cylinder 12 at its front end to retract the pusher 10. When the next bale engages the swinging arm 13 the cycle is repeated to cause the pusher 10 to push this bale across platform 9 to the platform 16 and to move the first bale across the platform 16. The next baler received again trips the swinging arm 13 and causes this third bale to be pushed onto the platform 16. This loads the platform 16 to the point that the first bale placed on the platform 16 engages the arm 17 and forces it toward the end 16a of the platform 16. The arm 17 is connected by a link 61 and an arm 62 to the valve 46. The arm 62 turns the valve 46 in the direction indicated in FIGURE 12 so as to cut off pressure from the pump 59 to the jacks 26 and 27 and to connect the jacks 26 and 27 to the reservoir 60. The weight of the platform 16 and the three bales causes the platform 16 to swing down from the bale receiving position shown in FIGURE 7 to the lowered position shown in FIGURE 9.

The lowering of the platform 16 causes the sprocket wheels 36 and 37 to turn and this in turn lowers the plate 18 over the bales on the platform 16.

This action takes place quickly enough to avoid interference with the advance of a new bale to the platform 9. Therefore when the next bale is pushed across the platform 9 it rides over the plate 18. Two more bales fills the load and brings the first bale placed on the plate 18 against the arm 19. The arm 19 moves the valve 47 in the direction of the arrow in FIGURE 12 to reverse the fluid supply to the jack cylinder 23 and actuate the pusher 20. The arm 19 is connected to the valve 47 by a link 63 and an arm 64.

The pusher 20 pushes the lower row of three bales rearwardly and these bales drag the bales on the plate 18 rearwardly with them to thus unload all six bales at once.

Whenever the bales are cleared from the buncher the arms 17 and 19 are free to move out under the influence of their springs 17a and 19a. The arms 17 and 19 reverse their valves 46 and 47 so that fluid is supplied in the proper direction to the cylinder 23 and the jacks 26 and 27 to retract the pusher 20 and lift the platform 16 to original bale receiving position. It is believed that the nature and operation of my invention will be clear from the foregoing description. Having described my invention, I claim:

1. A bale buncher for attachment to a hay baler, comprising:
    a wheeled vehicle framework;
    a horizontal receiving platform fixed upon said framework and adapted to carry a longitudinally aligned row of incoming bales;
    first stop means on said framework at one end of said receiving platform adapted to limit motion of incoming bales relative to said receiving platform;
    a storage platform movably mounted on said framework directly adjacent to said receiving platform, said storage platform being vertically shiftable between a first location level with said receiving platform and a second location one bale height lower and positioned directly below said first location to thereby enable bales to be stacked on said storage platform as they are received from said receiving platform;
    means on said framework operatively connected to said storage platform adapted to selectively position said storage platform at said first or second locations;
    first pusher means on said framework mounted for motion relative thereto across the upper surface of said receiving platform adjacent said first stop means adapted to selectively push individual bales from said receiving platform to said storage platform;
    and second pusher means on said framework mounted for motion relative thereto across the upper surface of said storage platform adapted to selectively push bales from said storage platform;
    first control means on said first stop means operatively connected to said first pusher means adapted to selectively actuate said first pusher means when said first stop means is contacted by an incoming bale on said receiving platform to thereby cause said first pusher means to shift the contacting bale onto the storage platform;
    second control means on said storage platform within the elevation of a first layer of bales thereon and located at the side thereof directly opposite said receiving platform, said second control means being operatively connected to said means to selectively position said storage platform and adapted, when contacted by a bale, to cause said last named means to shift said storage platform from said first location to said second location for reception thereon of a second layer of bales;
    and third control means on said storage platform within the elevation of a second layer of bales thereon and located directly above said second control means, said third control means being operatively connected to said second pusher means and adapted, when contacted by a bale, to cause said second pusher to push bales from said storage platform.

2. A bale buncher for attachment to a hay baler, comprising:
    a wheeled vehicle framework;
    a horizontal receiving platform fixed upon said framework and adapted to slidably carry a longitudinal row of incoming bales;
    a yieldable stop apparatus mounted on said framework at one end of said receiving platform adapted to normally limit motion of incoming bales relative to said receiving platform when the bales contact said stop apparatus;
    a storage platform mounted on said frame and including a plane bale supporting surface adapted to carry a row of parallel bales, said storage platform being movable relative to said framework between a first location wherein the plane surface thereof is level with the receiving platform and a second location wherein the plane surface is one bale height lower to thereby enable the storage platform to receive a second layer of bales, said second location being adjacent to the surface supporting said wheeled framework;
    first pusher means on said framework mounted for reciprocable motion relative thereto across the upper surface of said receiving platform adjacent said stop adapted to selectively push individual bales from said receiving platform to said storage platform;
    and second pusher means on said framework mounted for reciprocable motion relative thereto across the upper surface of said storage platform when in its second location relative to said framework, adapted to selectively push stacked bales from said storage platform to the surface supporting said wheeled framework;
    and said stop apparatus being pivotally mounted relative to said framework for motion about a vertical axis to the side of said receiving platform, said stop apparatus being yieldably biased to a transverse position wherein it normally arrests longitudinal motion of incoming bales and being adapted to swing clear of the bales when abutted with sufficient force to overcome the yieldable biasing force thereon.

References Cited by the Examiner

UNITED STATES PATENTS 2,702,131   2/55   Leupke _____ 214—6
2,739,718   3/56   Birchall.
2,752,050   6/56   Nordquist.
2,924,051   2/60   More.

HUGO O. SCHULZ, *Primary Examiner.*

ERNEST A. FALLER, JR., *Examiner.*